W. SMITH.
STUFFING BOX.
APPLICATION FILED MAR. 15, 1911.

1,029,474.

Patented June 11, 1912.

Witnesses
J. H. Crawford

Inventor
William Smith
By Victor J. Evans
Attorney

UNITED STATES PATENT OFFICE.

WILLIAM SMITH, OF WINTHROP, MASSACHUSETTS.

STUFFING-BOX.

1,029,474.　　　　　Specification of Letters Patent.　　Patented June 11, 1912.

Application filed March 15, 1911.　Serial No. 614,665.

*To all whom it may concern:*

Be it known that I, WILLIAM SMITH, a citizen of the United States, residing at Winthrop, in the county of Suffolk and State of Massachusetts, have invented new and useful Improvements in Stuffing-Boxes, of which the following is a specification.

This invention relates to stuffing boxes and the object of the invention is the provision of a device of this character which permits lateral and longitudinal movement of a rotating shaft which is slightly twisted or bent, without perceptible wear upon the stuffing box and without danger of breaking the shaft.

Further objects of the invention will appear as the following specific description is read in connection with the accompanying drawing, which forms a part of this application, and in which:—

Figure 1:
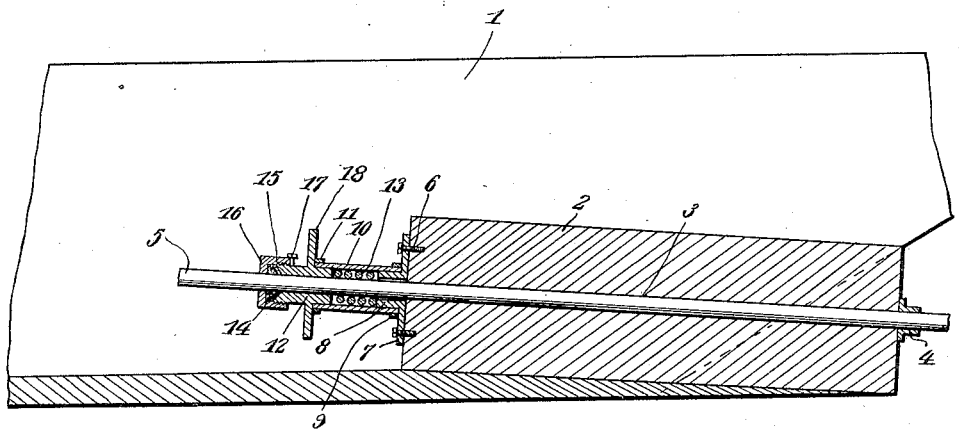
Figure 2:
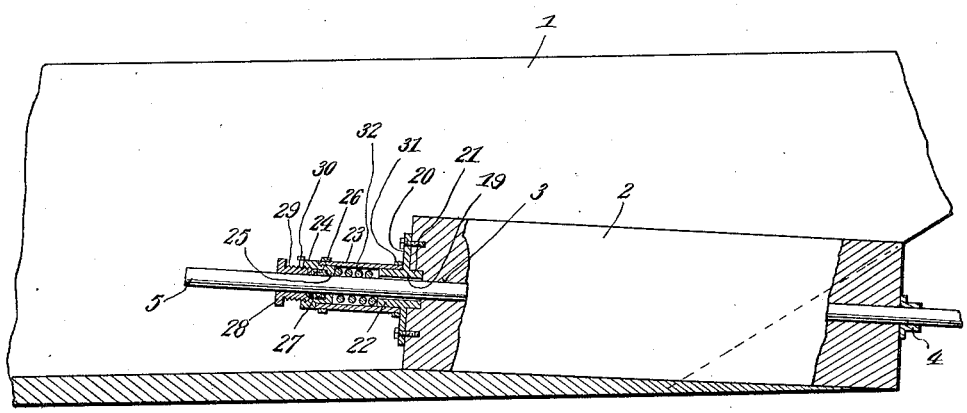

Figure 1 is a detail longitudinal vertical section through a boat and its pipe log. Fig. 2 is a similar view showing a modified form of stuffing box.

Referring to the drawing, and more particularly to Fig. 1, 1 represents a boat hull having a shaft log 2 mounted therein which is provided with the usual shaft channel 3 and secured to the outer end of the log is the customary outer bearing 4, through which the propeller shaft 5 passes. At the inner end of the log there is secured thereto, by means of lag screws 6 or in any other suitable manner, a collar 7 which surrounds the shaft 5 and is provided with the attaching flange 8. This collar has secured thereto, by means of a clamping ring 9, a flexible tubing 10 which surrounds the shaft and has secured to its opposite end, by means of a clamping ring 11, a similar collar 12. Interposed between the collars 7 and 12 is a spiral spring 13 which also surrounds the shaft and prevents the flexible tubing 10 from collapsing. The outer end of the collar 12 is beveled off, as shown at 14, and seated against this beveled portion and surrounding the shaft is a suitable packing 15 which is compressed against the beveled portion by means of a gland nut 16 which is threaded upon the outer end of the collar and is held in adjusted position by a check nut 17. The collar 12 is provided with an annular flange 18 which may be loosely stayed to the floor timbers, when found to be necessary, but this flange may be dispensed with, as will be shown and described for the construction in Fig. 2. The collar 7 has a shaft aperture considerably larger than the diameter of the shaft, so as to prevent binding thereon.

In the modification shown in Fig. 2, a collar 19 is shown having a laterally extending annular flange 20 adapted to be secured to the shaft log, the collar projecting in opposite directions from said flange, so as to provide a guiding extension 21 which enters the shaft log and an attaching extension 22 to which the flexible tubing 23 is secured. The opposite end of the flexible tubing is connected to an annular gland casing 24 having at one end an inwardly projecting annular flange 25 which forms a square shoulder 26 for the packing 27 to abut against. The outer end of the casing is provided with internal threads so as to receive the externally threaded cylindrical screw 28 which is beveled on its inner end, as at 29, so as to force the packing against the shaft. A lock nut 30 is mounted upon the screw 28 and is adapted to engage the end of the casing 24, to prevent the screw 28 from turning independently thereof. The flexible tubing is secured upon the collar 19 and upon the casing 24 by means of clamping rings 31, and the usual spiral spring 32 surrounds the shaft between the collar and the casing and prevents said tube from collapsing.

Having thus described the invention, what I claim as new is:—

In combination with a boat hull provided with a shaft log supporting a propeller shaft, of a packing gland surrounding the propeller shaft, a collar with an attaching flange secured to the rear end of said shaft log, a spiral spring surrounding said shaft, one end of said spring abutting against the outer edge of said attaching flange, the other end of said spring abutting against the inwardly extending portion of said packing gland, a flexible tube surrounding the shaft and spring between the collar and the packing gland, clamping rings surrounding the opposite ends of said flexible tube for securing the tube to the collar and gland, said spring preventing the tube from collapsing.

In testimony whereof I affix my signature in presence of two witnesses.

WILLIAM SMITH.

Witnesses:
GEORGE A. GOVE,
JOHN F. BRIRY.

Copies of this patent may be obtained for five cents each, by addressing the "Commissioner of Patents, Washington, D. C."